United States Patent
Hur et al.

(10) Patent No.: US 6,885,721 B2
(45) Date of Patent: Apr. 26, 2005

(54) INHIBITION METHOD OF STRESS CORROSION CRACKING OF NUCLEAR STEAM GENERATOR TUBES BY LANTHANUM BORIDE

(75) Inventors: Do Haeng Hur, Taejon-si (KR); Joung Soo Kim, Taejon-si (KR)

(73) Assignees: Korea Atomic Energy Research Institute, Taejon-si (KR); Korea Hydro & Nuclear Power Co., Ltd., Seoul (KR)

( * ) Notice: Subject to any disclaimer, the term of this patent is extended or adjusted under 35 U.S.C. 154(b) by 13 days.

(21) Appl. No.: 10/102,091

(22) Filed: Mar. 19, 2002

(65) Prior Publication Data

US 2002/0150195 A1 Oct. 17, 2002

(30) Foreign Application Priority Data

Mar. 26, 2001 (KR) .................................. 10-2001-15552

(51) Int. Cl.$^7$ ............................................. G21C 19/00
(52) U.S. Cl. ........................ 376/305; 376/306; 252/387; 252/389.4; 252/389.51; 422/7; 422/53; 436/6
(58) Field of Search ................................. 376/305, 306; 252/387, 389.4, 389.51; 422/14, 19, 53, 7; 436/6

(56) References Cited

U.S. PATENT DOCUMENTS

| 4,261,753 A | * | 4/1981 | Holcombe et al. ............. 106/56 |
| 4,555,326 A | * | 11/1985 | Reid ........................ 208/48 R |
| 4,636,292 A | * | 1/1987 | Fejes et al. .................. 204/404 |
| 4,686,067 A | * | 8/1987 | Veysset et al. ............... 252/626 |
| 5,793,830 A | * | 8/1998 | Kim et al. ................... 376/305 |
| 5,796,799 A | * | 8/1998 | Kobayashi et al. ............. 376/306 |
| 5,864,596 A | * | 1/1999 | Egerbrecht et al. ............ 376/306 |
| 6,165,551 A | * | 12/2000 | Lukaes, III et al. ............ 427/228 |

OTHER PUBLICATIONS

An article entitled "Mechanism and Effectiveness of Inhibitors for SCC in a Caustic Environment", By J.B. Lumsden et al., published by Proceedings of Seventh International Symposium on Environmental Degradation of Materials in Nuclear Power Systems—Water Reactors, pp. 317–325, (1995).

An article entitled "Secondary Side Degradation Of Steam Generating Tubing: Which Inhibitors For . . . ", By Daret et al., published by Proceedings of Eigth International Symposium on Environmental Degradation of Materials in Nuclear Power Systems—Water, pp. 100–107, (1997).

* cited by examiner

*Primary Examiner*—Jack Keith
(74) *Attorney, Agent, or Firm*—Bachman & LaPointe, P.C.

(57) ABSTRACT

The present invention relates to a method for inhibiting stress corrosion cracking occurring on steam generator tubes in the secondary side of nuclear power plants and an inhibitor therefor. The method comprises supplying lanthanum boride as an inhibitor for stress corrosion cracking into the secondary feed water of the nuclear power plants. The method according to the present invention improves the resistance of stress corrosion cracking ten times or higher than no inhibitor, and five times or higher than the conventional inhibitor. In particular, the method according to the present invention shows a superior inhibiting effect in the lead-contaminated environment such that the complete inhibition of stress corrosion cracking can be achieved. As thus, the method can reduce the unexpected stop of operating nuclear power plants caused by the stress corrosion cracking on steam generator tubes, thereby reducing the cost required for maintaining and repairing the tubes.

6 Claims, 6 Drawing Sheets

INHIBITION METHOD OF STRESS CORROSION CRACKING OF NUCLEAR STEAM GENERATOR TUBES BY LANTHANUM BORIDE

FIELD OF THE INVENTION

The present invention relates to a method for inhibiting stress corrosion cracking occurring on steam generator tubes in the secondary side of nuclear power plants (NPPs) and an inhibitor therefor.

BACKGROUND OF THE INVENTION

It was reported that Ni alloys, especially, ones used as steam generator tubes in nuclear power plants, frequently suffered from intergranular corrosion and stress corrosion cracking in the environment. The intergranular corrosion and stress corrosion cracking occurring on steam generator tubes in NPPs may result in the leakage of the primary cooling water into the secondary side, unexpected stop of operating NPPs, and high cost for inspecting and repairing the cracked tubes. Therefore, the development of an inhibitor and a method for inhibiting the intergranular corrosion and stress corrosion cracking occurring on steam generator tubes in NPPs is urgently demanded.

Up to now, boric acid has been used as an inhibitor for stress corrosion cracking. However, it was proved not to be an effective inhibitor in inhibiting the intergranular corrosion and stress corrosion cracking on steam generator tubes in NPPs.

Recently, titanium oxide as an inhibitor, which introduces into the high temperature and high alkali feed water so as to inhibit stress corrosion cracking, was reported. However, quantitative analysis of its effectiveness in inhibiting the intergranular corrosion and stress corrosion cracking has not been performed yet.

Furthermore, an inhibitor or a method for inhibiting stress corrosion cracking occurring on steam generator tubes in environments contaminated with at least one lead compound such as lead oxide, lead chloride, lead sulfide which were known to accelerate stress corrosion cracking has not been developed yet.

SUMMARY OF THE INVENTION

Leading to the present invention, the intensive and thorough research on an inhibitor or a method for inhibiting stress corrosion cracking occurring on steam generator tubes in the secondary side of NPPs carried out by the present inventors aiming to avoid the problems encountered in the prior arts, and resulted in the finding that the powerful inhibition of intergranular corrosion and stress corrosion cracking occurring on steam generator tubes, compared with no inhibitor or the conventional inhibitors such as boric acid and titanium oxide, can be achieved by supplying the lanthanum boride as an inhibitor into the secondary side feed water of NPPs.

Therefore, it is an object of the present invention to provide a novel inhibitor in order to overcome the problems caused by the intergranular corrosion and stress corrosion cracking occurring on steam generator tubes in the secondary side of the NPPs.

It is another object of the present invention to provide lanthanum boride as an inhibitor for inhibiting intergranular corrosion and stress corrosion cracking occurring on steam generator tubes in the secondary side of NPPs.

And, it is a further object of the present invention to provide a method for inhibiting the intergranular corrosion and stress corrosion cracking occurring on steam generator tubes in the secondary side of NPPs, which comprises supplying the lanthanum boride as an inhibitor into the secondary feed water to form chromium-enriched oxide film on the surface of steam generator tubes.

DETAILED DESCRIPTION OF THE INVENTION

The present inventors discovered that the lanthanum boride could significantly increase the resistance of steam generator tube to intergranular corrosion and stress corrosion cracking in high temperature caustic environments with and without lead compounds.

The lanthanum boride in an amount of from about 0.1 ppb to 1,000 ppm as an inhibitor for stress corrosion cracking is preferably added into the secondary feed water. More preferably is from 1 ppb to 100 ppm.

According to the embodiment of the present invention, the lanthanum boride improves the resistance to intergranular corrosion and stress corrosion cracking ten times or higher than no inhibitor, and five times or higher than the conventional inhibitor, titanium oxide. This is clearly shown in FIG. 1.

Figure 6:
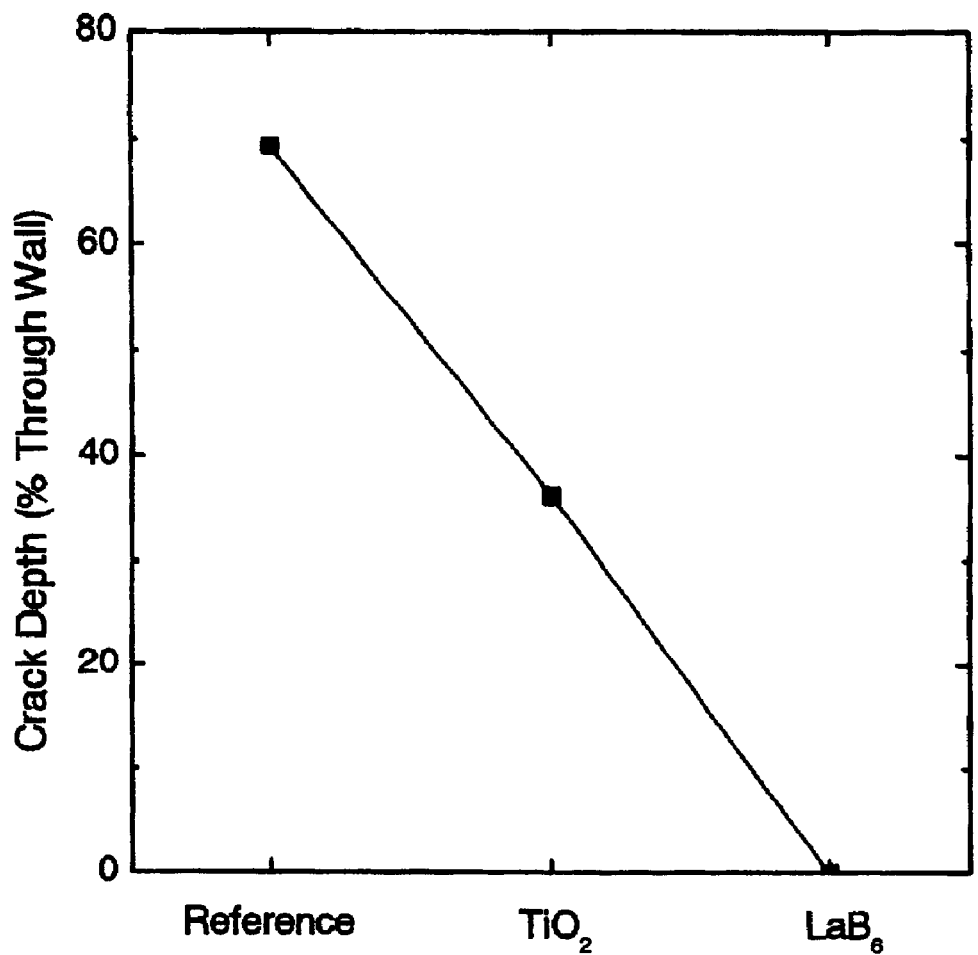
FIG. 6 is a graph showing the relative inhibiting effect on stress corrosion cracking in the lead oxide-contaminated caustic environment.

Recently, it was reported that the lead compounds such as lead oxide, lead chloride, lead sulfide accelerate stress corrosion cracking occurring on steam generator tubes in the secondary side of NPPs. According to another embodiment of the present invention, the inhibitor also showed a very powerful inhibition of stress corrosion cracking in the lead-contaminated caustic environment. This is shown in FIG. 6.

The present invention also relates to a method for inhibiting intergranular corrosion and stress corrosion cracking occurring on steam generator tubes in the secondary side of NPPs. The method comprises supplying the lanthanum boride as an inhibitor for stress corrosion cracking into the secondary feed water of NPPs. More specifically, the method comprises supplying the lanthanum boride in the amount ranging from 0.1 ppb to 1,000 ppm into the secondary feed water of NPPs. The room temperature pH of the secondary feed water is generally varied from 5.0 to 9.5; the temperature is lower than 330° C., more preferably, 150–315° C.

The lanthanum boride added to the secondary feed water has a protective film formed on the surface of steam generator tubes. The protective film can be formed by circulating the secondary feed water under the normal operating conditions, or by stopping it for from 0.5 to 240 hours. Particularly, the protective film formed in the solution containing the lanthanum boride has been found to show a powerful inhibiting effect on the stress corrosion cracking occurring on steam generator tubes in the environment contaminated with the lead compounds.

The application of the preferred embodiments of the present invention is best understood with examples and the accompanying drawings.

Figure 1:
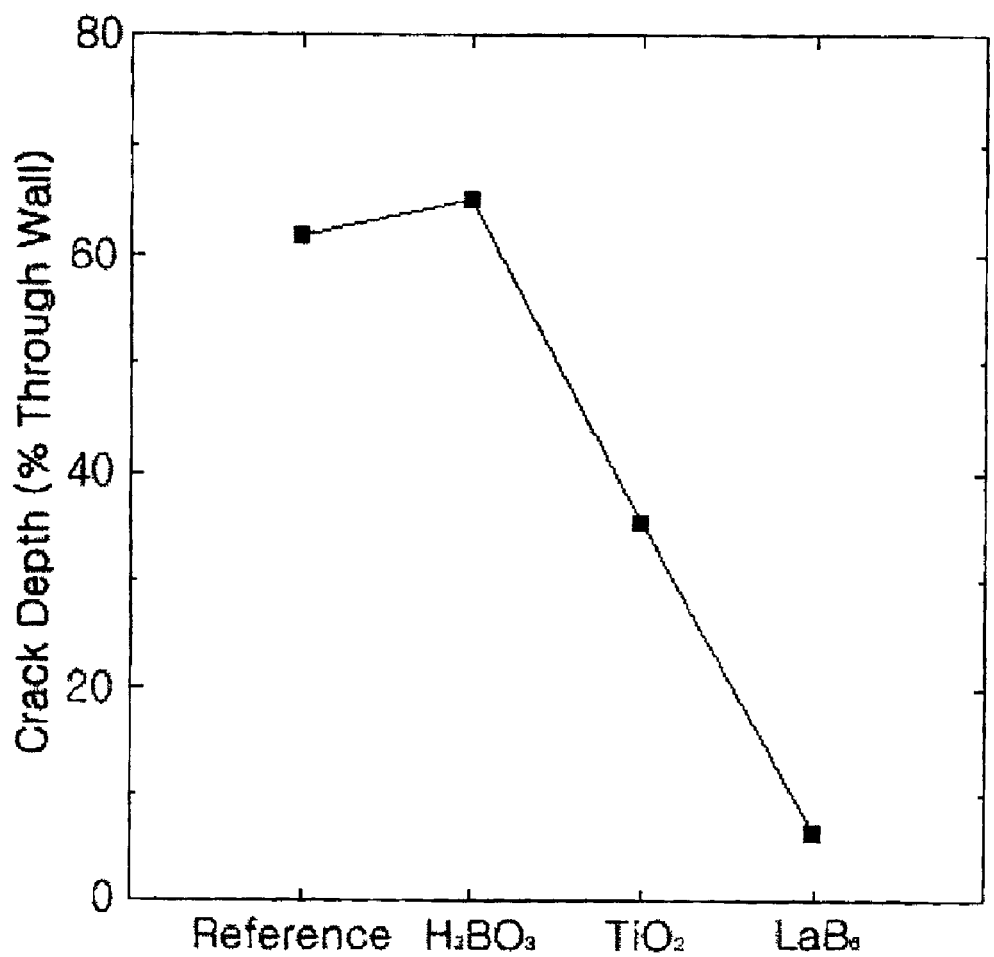
FIG. 1 is a graph showing the relative inhibition effectiveness on stress corrosion cracking in a caustic solution containing no inhibitor ("reference"), a conventional inhibitor ("$H_3BO_3$"), a conventional inhibitor ("$TiO_2$"), and an inhibitor ("$LaB_6$") according to the present invention.

FIG. 1 is a graph showing the relative inhibiting effects on stress corrosion cracking of Alloy 600 steam generator tubes for no inhibitor ("reference"), boric acid ("$H_3BO_3$"), titanium oxide ("$TiO_2$"), and lanthanum boride ("$LaB_6$") according to present invention, respectively.

The experiments were carried in 10% NaOH solution at 315° C., because the stress corrosion cracking in the secondary side of steam generator tubes was frequently observed to occur in a high-alkali environment during the operation of the steam generator.

The specimens for the stress corrosion cracking test were fabricated as C-ring and stressed until their outer diameter was deflected by 1.5 mm. To accelerate the stress corrosion cracking rate, the specimens were polarized at a potential of 150 mV above the corrosion potential. The amount of the inhibitors used was 4 g/L. After 5 days, the percentage of the stress corrosion crack depth relative to the thickness of the specimen was measured and the result thereof was shown in FIG. 1. These values were obtained by averaging the maximum crack depths developed from the different three specimens. As shown in FIG. 1, the lanthanum boride according to the present invention has highly improved the resistance to stress corrosion cracking ten times or higher than no inhibitor (which is denoted as "reference"), and five times or higher than the conventional inhibitor, titanium oxide. In addition, boric acid was not effective to inhibit cracking under this severe environmental condition.

Figure 2:
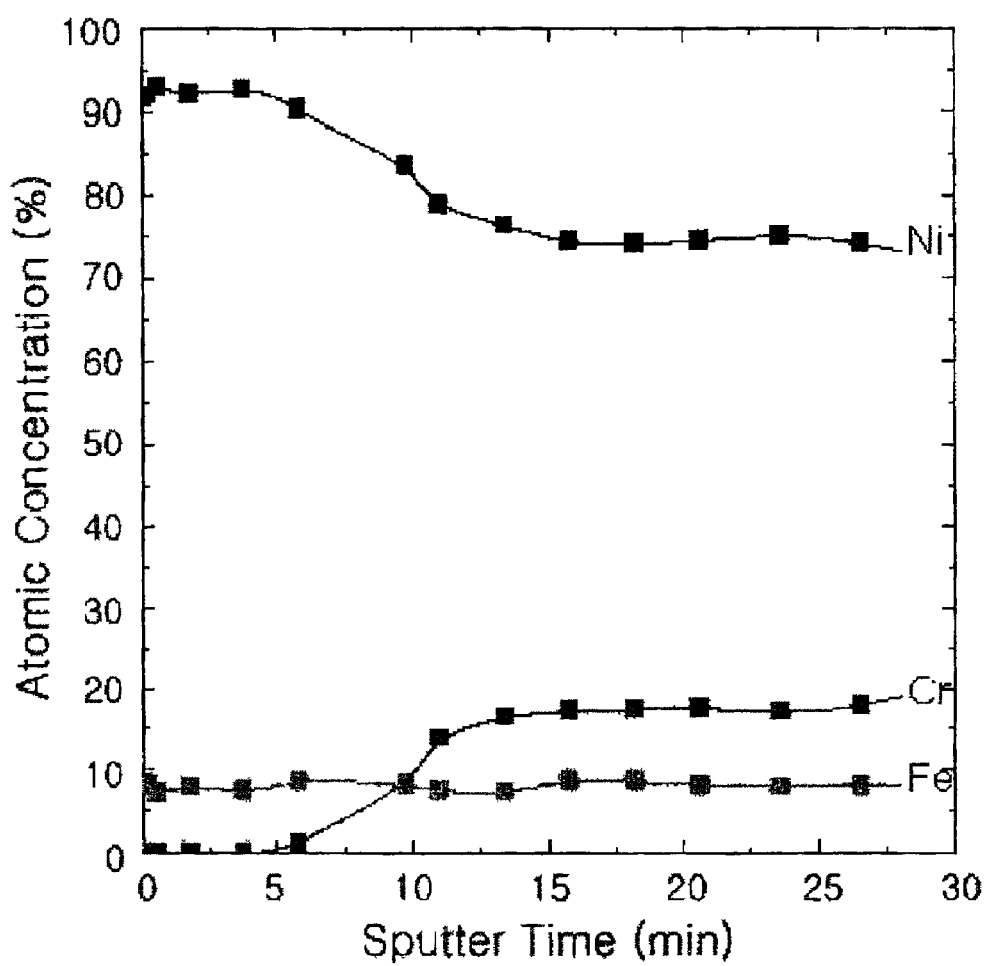
FIG. 2 is a graph showing the depth profiles of the main alloying elements in the film formed at the crack tip of the steam generator tubes in the caustic solution, wherein no inhibitor is added.
Figure 3:
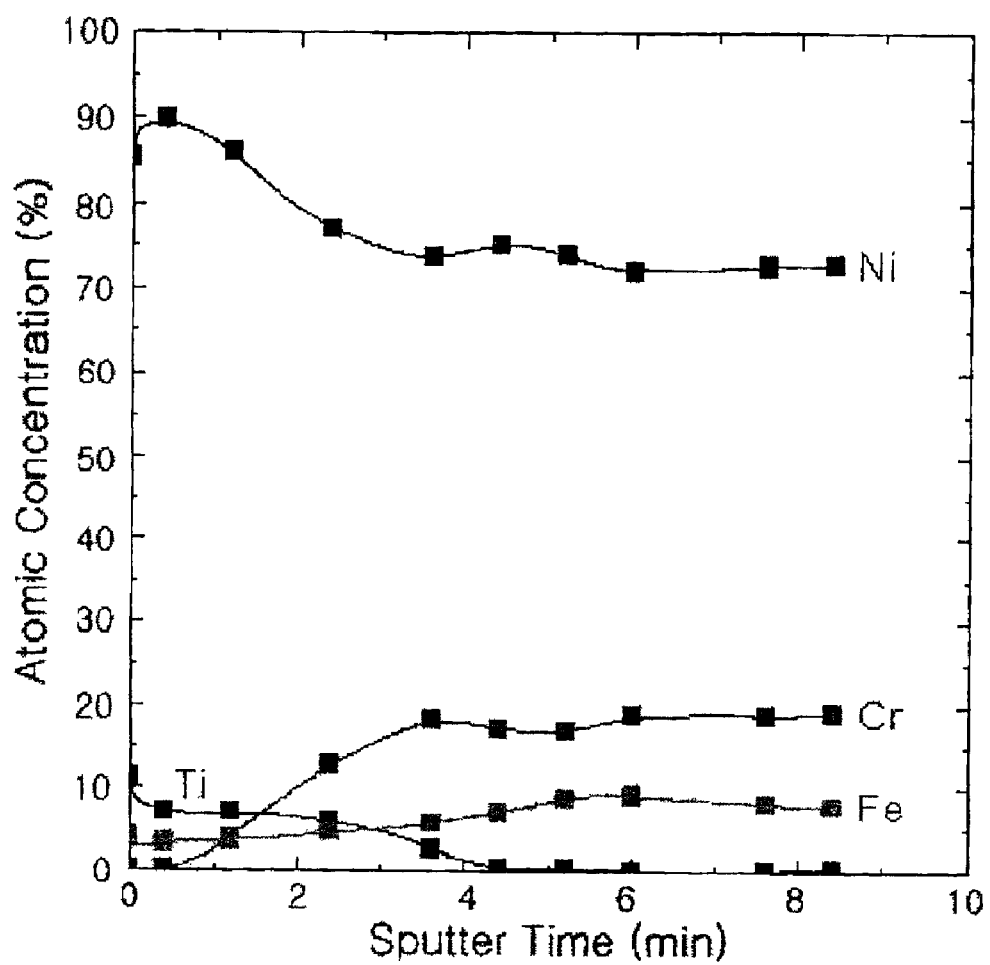
FIG. 3 a graph showing the depth profiles of the main alloying element and Ti in the film formed at the crack tip of steam generator tubes in the caustic solution, wherein a conventional inhibitor, the titanium oxide, is added.
Figure 4:
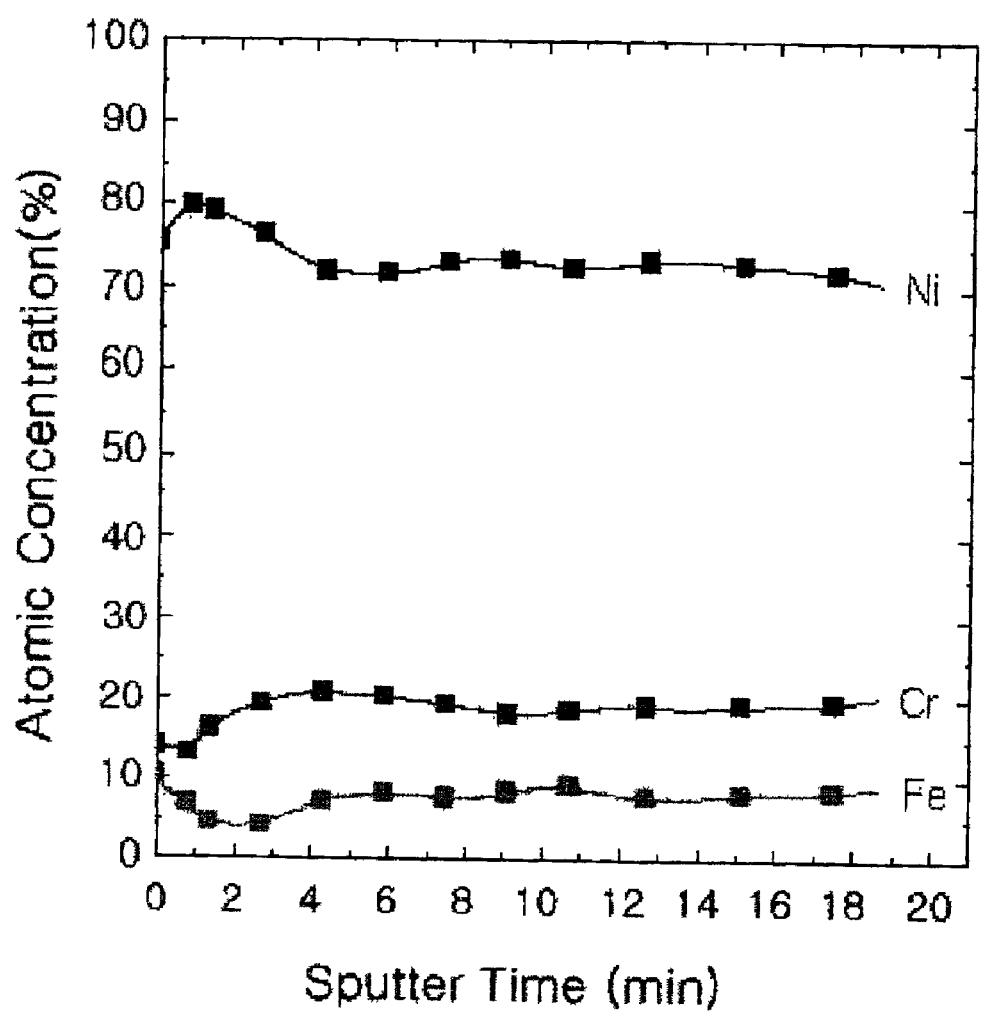
FIG. 4 a graph showing the depth profiles of the main alloying elements in the film formed at the crack tip of steam generator tubes in the caustic solution, wherein the lanthanum boride according to the present invention is added.

FIG. 2 is a graph showing the depth profiles of the main alloying elements, measured with a scanning Auger spectroscope, in the surface film formed at the crack tip of the steam generator tubes in the caustic solution, wherein no inhibitor is added, and FIGS. 3 and 4 are for the titanium oxide and for the lanthanum boride, respectively.

The depth profiles of the elements in the film were obtained by sputtering with argon. The compositions at the left region, as shown in FIGS. 2, 3 and 4, represent the compositions at the outer layer of the film As shown in FIG. 2, with no inhibitor, no chromium was observed in the outer layer of the film and thus the film was found to be significantly chromium-depleted.

With the conventional inhibitor, titanium oxide, the extent and the depth of the chromium depletion in the film were found to be less significant than that with no inhibitor (FIG. 3). The chromium depletion in the films on tube material is due to the selective dissolution of chromium. Consequently, the films become porous and non-protective, resulting in susceptible to stress corrosion cracking.

To the contrary, when the lanthanum boride was added as an inhibitor for stress corrosion cracking, chromium-depleted region in the film was not observed. Further, it was found that chromium was enriched in the outer layer of the film.

It was widely acknowledged that chromium oxides play an important role in improving the resistance to localized corrosion, such as pitting, stress corrosion cracking, intergranular attack, etc.

As thus, the lanthanum boride according to the present invention can highly improve the resistance to stress corrosion cracking by forming a protective and chromium-enriched oxide film. This is shown in FIG. 4. That is, the inhibitor and the inhibiting method according to the present invention will exhibit the improved inhibition of stress corrosion cracking, which is distinguished from the conventional inhibitors or methods.

Figure 5:
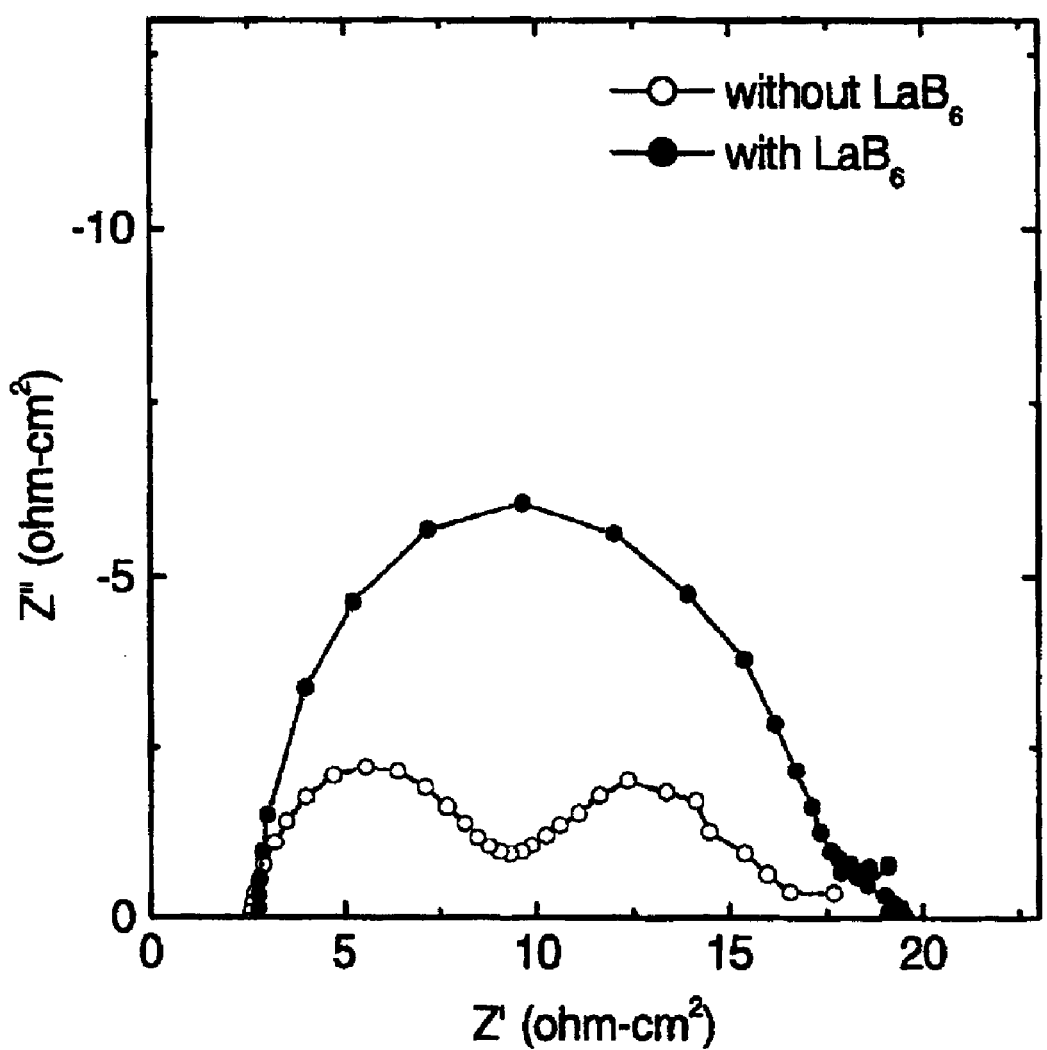
FIG. 5 is a graph showing the electrochemical impedance data measured in the solution with and without lanthanum boride according to the present invention.

Electrochemical impedance measurements were made at the corrosion potential in 10% NaOH solution with and without lanthanum boride at 315° C. FIG. 5 shows Nyquist plot of the impedance spectra. The frequency response curves in the solution containing no inhibitor showed the extra time constant in low frequency range. However, Nyquist curve obtained in the lanthanum containing solution showed only one capacitive loop. This result indicates that the addition of lanthanum boride decreased the corrosion rate of the tube material, especially selective dissolution of chromium, which can be well rationalized by the result obtained in FIG. 3.

FIG. 6 is a graph showing the inhibiting effect of the lanthanum boride on stress corrosion cracking of Alloy 600 steam generator tubes in lead oxide-contaminated environment.

The experiment was conducted in 10% NaOH aqueous solution containing 5,000 ppm of PbO at 315° C.

The specimens for the stress corrosion cracking tests were fabricated as C-ring and stressed until their outer diameter was reduced by 1.5 mm. To accelerate the stress corrosion cracking rate, the specimens were polarized at a potential of 150 mV above the corrosion potential. The amount of the inhibitors used was 4 g/L for the titanium oxide and was 1 g/L for the lanthanum boride. After 5 days, the percentage of the stress corrosion crack depth relative to the thickness of the specimens was measured and the result thereof is shown in FIG. 6.

The depth of the crack formed in the caustic solution containing no inhibitor was measured to be 70% of the thickness of the specimens, and 40% in the solution with the titanium oxides. However, with the lanthanum boride according to the present invention, no cracking was formed.

Therefore, the inhibitor, lanthanum boride, according to the present invention has a superior inhibiting effect on stress corrosion cracking in the environment contaminated with lead compounds.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for inhibiting intergranular corrosion and stress corrosion cracking occurring on steam generator tubes in the secondary side of nuclear power plants, comprising the step of supplying the lanthanum boride as an inhibitor for stress corrosion cracking into the secondary feed water of nuclear power plants, wherein the pH of the secondary feed water is from 5.0 to 9.5 at a secondary feed water temperature of lower than 330° C.

2. The method as set forth in claim 1, wherein the lanthanum boride is used in an amount of from 0.1 ppb to 1,000 ppm.

3. The inhibition method as set forth in claim 1, wherein the lanthanum boride-added feed water is circulated to form a protective film on the surface of the steam generator tubes in nuclear power plants.

4. The method as set forth in claim 1, wherein the circulation of the lanthanum boride-added feed water is stopped for from 0.5 to 240 hours to form a protective film on the surface of the steam generator tubes in nuclear power plants.

5. The method as set forth in claim 1, wherein the secondary feed water is contaminated with at least one lead compound.

6. The method as set forth in claim 5, the lead compound is selected from the group consisting of lead oxide, lead chloride and lead sulfide.

* * * * *